United States Patent [19]

Maejima et al.

[11] Patent Number: 4,901,274

[45] Date of Patent: Feb. 13, 1990

[54] METHOD AND SYSTEM FOR DATA DRIVEN INFORMATION PROCESSING

[75] Inventors: Yukihito Maejima, Hachioji; Hirotoshi Shirasu, Yokohama; Taihei Suzuki, Kodaira; Yoshiaki Tokita, Yokohama; Shirou Tanabe, Hachioji; Takashi Morita, Yokohama, all of Japan

[73] Assignee: Hitachi, Ltd., Tokyo, Japan

[21] Appl. No.: 753,852

[22] Filed: Jul. 11, 1985

[30] Foreign Application Priority Data

Jul. 11, 1984 [JP] Japan ............................ 59-142283
Nov. 21, 1984 [JP] Japan ............................ 59-244432

[51] Int. Cl.$^4$ .................... G06F 9/40; G06F 9/30; G06F 15/20
[52] U.S. Cl. ........................ 364/900; 364/940.71; 364/941.4; 364/955.5; 364/957.6; 364/963.3
[58] Field of Search ... 364/200 MS File, 900 MS File

[56] References Cited

U.S. PATENT DOCUMENTS

| | | | |
|---|---|---|---|
| 3,662,401 | 9/1972 | Collins et al. | 364/300 |
| 3,955,180 | 5/1976 | Hirtle | 364/200 |
| 3,978,452 | 8/1976 | Barton et al. | 364/200 |
| 4,327,407 | 4/1982 | Burrows | 364/200 |
| 4,575,816 | 3/1986 | Hendrickson et al. | 364/900 |
| 4,584,642 | 4/1986 | Fudanuki | 364/200 |

OTHER PUBLICATIONS

Conference Record of the National Telesystems Conference, Galveston, Texas, 7th–10th Nov. 1982, pp. B5.2.1–B5.2.5, IEEE; J. A. Eggert et al., "Distributed Data Flow Signal Processors" * p. B5.2.2, left-hand column, paragraph 2; p. B5.2.3, left-hand column, paragraph 3*.

*Primary Examiner*—Raulfe B. Zache
*Assistant Examiner*—Emily Y. Chan
*Attorney, Agent, or Firm*—Antonelli, Terry & Wands

[57] ABSTRACT

An I/O prescription table (I/O PTBL) is associated with a processing program module that is executed by a conventional sequential execution type processor. Each processing program module fetches the input data according to its associated I/O PTBL and stores the output data in the same table. An execution control program makes reference to the I/O PTBL associated with the processing program module, updates the designated I/O PTBL so as to indicate that the corresponding input data is prepared, and starts the processing program module associated with the I/O PTBL which is furnished with all of the necessary input data.

8 Claims, 12 Drawing Sheets

METHOD AND SYSTEM FOR DATA DRIVEN INFORMATION PROCESSING

BACKGROUND OF THE INVENTION (1) Field of the Invention

This invention relates to a stored program controlled data processing system, and more specifically to the data driven type control of such a system.

(2) Description of the Prior Art

The data driven (or data flow) type control method is to control a processing sequence depending upon the flow of data, i.e., depending upon the preparation situation of data that are to be processed, and has hitherto been studied in order to realize a so-called non-Neumann type computer (see "Trend of Data Flow Computers Innovating the Construction of Computers", Part 1, Nikkei Electronics, May 28, 1979, pp. 64–81). The data driven non-Neumann type computer has an architecture which is fundamentally different from a conventional so-called Neumann type computer, i.e. a computer in which a program is sequentially executed in a predetermined single stream (or referred to as the sequential execution type computer in this specification), and is designed in an attempt to increase data processing ability relying upon parallel processing. For operations which do not require such high processing abilities, therefore, the data driven non-Neumann type computer becomes very expensive, and is not always ideal.

On the other hand, the conventional sequential execution type machine has various difficulties not only with respect to the data processing ability but also to the preparation of software. Regarding the latter point, the data driven type control is advantageous since it clarifies correlations of input and output data among various portions of the program and clarifies execution conditions of various portions, making it possible to easily comprehend the whole construction of the program and, accordingly, to easily develop software and to effect debugging and modifications.

When high data processing ability is not required, a compromised proposal is to prepare such a program which operates the conventional sequential execution type machine in the data driven type mode. However, an excess overhead results from the procedure which checks whether the required operands are prepared for the individual operation instructions and which indicates, every time an instruction is executed, the preparation of an operand for every instruction requiring as its operand the data produced by the execution. Therefore, such is not practicable. Further, to transfer the data produced by every instruction to operand address locations of all instructions that require the produced data causes the quantity of memory access to increase and the processing speed to decrease.

SUMMARY OF THE INVENTION

The object of the present invention is to realize a practical and general-purpose data driven type control suited for a conventional sequential execution type machine, which minimizes the reduction of processing ability caused by overhead and other factors.

As stated above, the sequential execution type machine involves difficulty with regard to developing software. In practice, however, the difficulty arises when the software has a large scale and is complex, and arises very little when the program is small in scale (about several hundred steps or less in machine words) and is independent. Giving attention to this point, the present invention enjoys the advantage of data driven logic in constructing a large-scale software architecture by linking relatively small and independent sequential execution type processing program modules, each serving as a unit, by means of the data driven type control relying upon tables in which are collected the information related to input and output data.

In a data processing system which comprises a sequential execution type processor, according to the present invention, I/O prescription tables are prepared in a memory, each of the I/O prescription tables being associated with a processing program module, and containing input data source information, input situation information, output notice destination information, and output data storage area for the associated processing program modules. When started, the processing program module makes reference to its associated table, reads the input data according to the input source information, performs a predetermined processing of the sequential execution type, and writes the resultant output data on the output data storage area in the table. Then, the execution control program makes reference to the same table, and updates the input situation information in the designated tables so as to indicate that the corresponding input data are prepared. Further, the execution control program registers a table which is furnished with all of the required input data at the tail of a queue, successively fetches tables waiting in the queue in order starting from the head thereof, and actuates the associated processing program modules.

This control method can be executed by a data processing system having a single processor of the sequential execution type. Further, a processing unit for executing processing program modules may be provided separately from a processing unit for execution control. Moreover, provision may be made for a plurality of processing units for executing groups of processing program modules, together with a plurality of table memories and queue memories respectively associated therewith.

According to the present invention, the data driven type control can be realized using a conventional machine of the type of sequential execution, without particularly changing the hardware and without causing the overhead to be greatly increased. Therefore, input conditions and starting conditions for various portions of a program are obvious, and the order of their execution is free from the order of their description, making it possible to substantially enjoy the advantage of data driven type control. This facilitates the development and maintenance of software, and is particularly advantageous for the sorfware of a large scale.

The above-mentioned and other features as well as objects of the present invention will become more apparent from the following description taken in conjunction with the accompanying drawings.

DETAILED DESCRIPTION OF THE PREFERRED EMBODIMENTS

Figure 1:
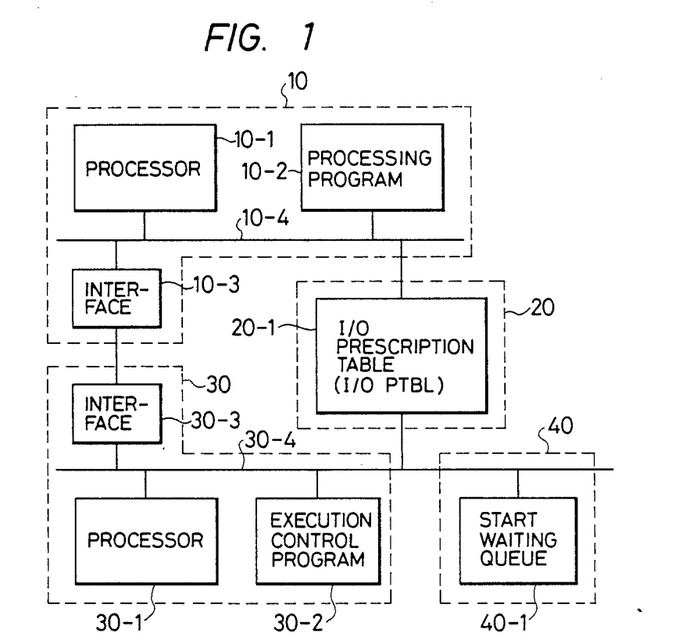
FIG. 1 is a block diagram showing a data processing system according to the present invention.

FIG. 1 shows a data processing system for implementing the control method of the present invention. Generally, this system consists of a processing unit 10 for processing data, a memory 20 for I/O prescription table (I/O PTBL) for the data driven type control, a processing unit 30 for execution control, and a memory 40 for start waiting queue.

The processing unit 10 for processing data consists of a sequential execution type processor 10-1, a memory 10-2 which stores a plurality of small and independent processing program modules, an interface circuit 10-3 for communication with the processing unit 30 for execution control, and a processor bus 10-4 coupling them. The memory 20 for input/output prescription table (I/O PTBL) holds I/O PTBL's 20-1 respectively associated with the processing program modules, and each I/O PTBL contains program identifying information (program number, starting address, etc.), input data preparation situation indicating information, input data designating information (address or literal), output data storage area, output notice destination designating information, and any other information related to the input and output of its associated processing program module.

The processing unit 30 for execution control consists of a sequential execution type processor 30-1, a memory 30-2 which stores an execution control program, an interface circuit 30-3 for communication with the processing unit 10 for processing data, and a processor bus 30-4 that connects them. The processor bus 30-4 and the processor bus 10-4 in the data processing unit 10 are also connected to the memory 20 which stores I/O PTBL's.

The memory 40 for start waiting queue is connected to the processor bus 30-4 in the processing unit for execution control, and provides a start waiting queue 40-1 which register,, in the form of FIFO, the addresses of I/O PTBL's associated with program modules which are furnished with the whole input data.

Operation of the whole system will be described below. The processing unit 30 for execution control scans the I/O PTBL's 20-1. When a table furnished with the whole input data is found, the address of this table is registered at the end of the start waiting queue 40-1. When the scanning for the whole tables is finished, the processing unit 30 for execution control fetches the address of a starting table at the beginning of the queue, reads from this table information identifying the associated processing program module, and sends the information together with the address of this table to the data processing unit 10 via the interface circuit 30-3. Upon receipt of these information via the interface circuit 10-3, the data processing unit 10 executes the processing program by making reference to the associated I/O PTBL using input data designated thereby, and writes the output data into a predetermined area of the table. Then, the data processing unit 10 informs the processing unit 30 for execution control of the completion of processing via the interface circuit 10-3. Upon receipt of this information via the interface circuit 30-3, the processing unit 30 for execution control initiates the execution control program, examines the associated I/O PTBL 20-1, and resets the input data preparation situation indicator in the I/O PTBL's of all of the output notice destinations designated thereby. If there is a processing program module furnished with the whole input data, the processing unit 30 for execution control registers it in the start waiting queue 40-1.

Figure 2:
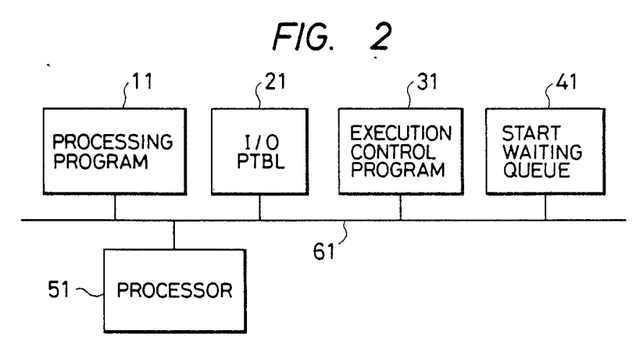
FIG. 2 is a block diagram showing another data processing system according to the present invention.

FIG. 2 shows a system consisting of a sequential execution type processor 51, a memory 11 for storing a processing program, a memory 21 for storing I/O prescription table, a memory 31 for storing execution control program, and a memory 41 for start waiting queue, that are connected to one another through a processor bus 61. The thus constructed system also realizes the data driven type control which is essentially the same as the above-mentioned one, since the processing program and the execution control program are alternately executed by the processor 51. It is allowable to store the contents of these memories 11, 21, 31, and 41 in the respective areas of a single memory unit, as a matter of course.

Figure 3:
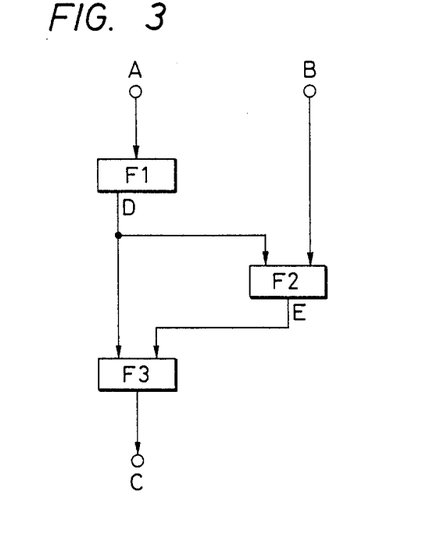
FIG. 3 is a program chart showing a data driven type program.

Details will be described below. FIG. 3 shows a simple data driven type program to which the present invention is adapted. This as a whole is a program which effects the processing on the input data A and B to obtain a resultant output data C. The substance of processing is represented by the combination of small and independent processing program modules F1, F2 and F3. The delivery and reception of data among the processing program modules are indicated by arrow lines. The substances of processing program modules F1 to F3 are realized by ordinary sequential execution type programs which are executed when necessary input data are all furnished independently of the designation of the program counter or the description order (or storage positions) of the programs, unlike the ordinary sequential execution type program. That is, the processing program module F1 is readily executed provided there exists the input data A, and the processing program module F2 is started when there exists the input data B and also the processing program module F1 has finished the production of output D. The processing program module F3 is not started until the processing program module F1 and the processing program module F2 have finished the production of output data D and E, respectively.

Figure 4:
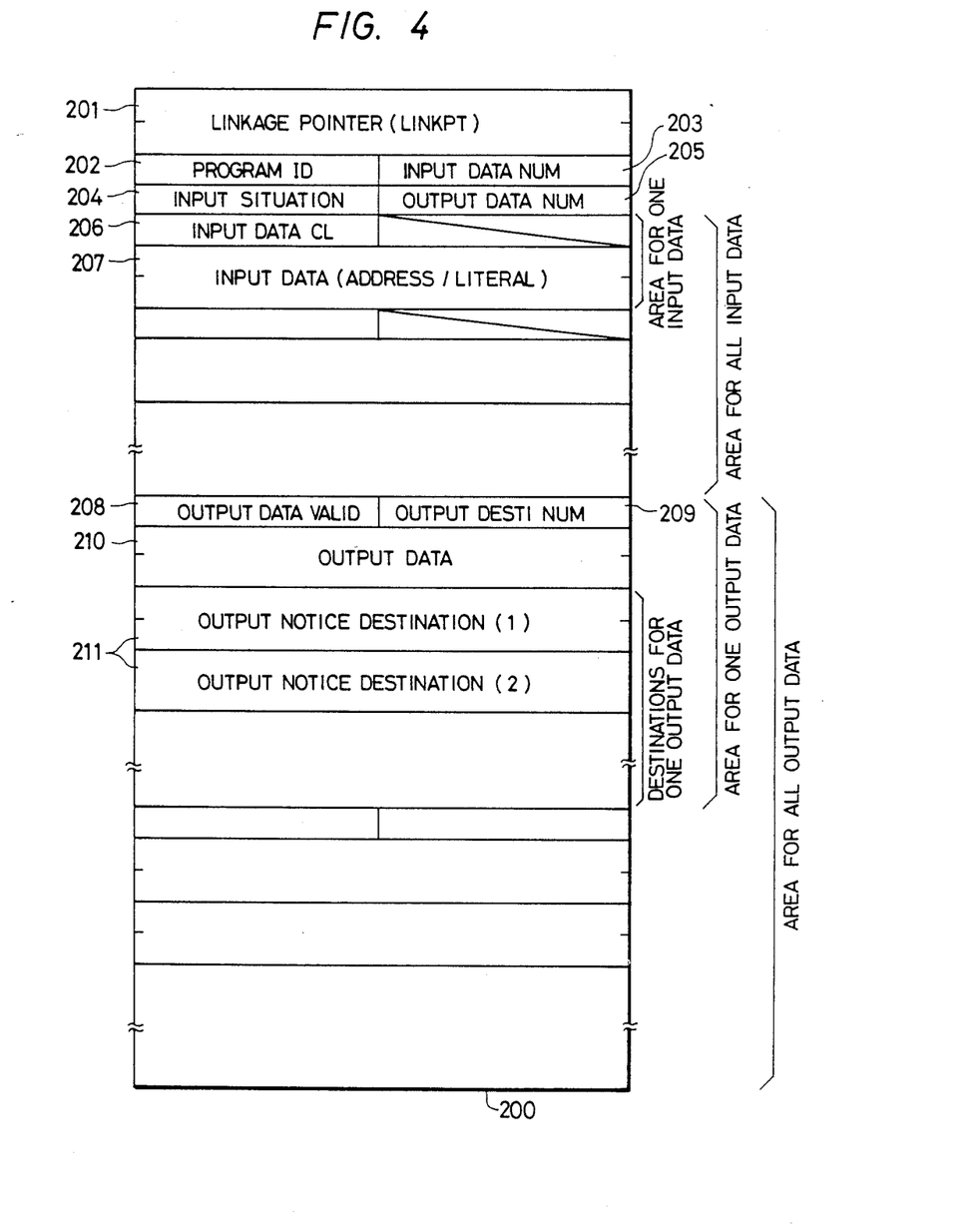
FIG. 4 shows an input/output prescription table.

Means through which the input and output data are transferred and received among the processing program modules is the I/O prescription table (I/O PTBL) which is shown in FIG. 4. Every processing program module possesses an associated I/O PTBL. An I/O PTBL 200 associated with a processing program module has respective areas for a linkage pointer (LINKPT) 201 for forming a start waiting queue, an identifier (program name, program number, or starting address) 202 for identifying the associated processing program module, an input data number 203, an input situation indicator 204 for indicating the preparation situation of input data, an output data number 205, an input data class 206, an input data designator (literal data or address) 207, an output data validity indicator 208, an output notice destination number 209, an output data storage 210, and an output notice destination designator 211. Sets of areas 206 and 207 ar provided in the number of input data required for the associated program, the areas 211 are provided in the number of notice destinations for each output data, and sets of the areas 208 to 211 are provided in the number of all output data that are produced by the associated program.

The linkage pointer 201 and the output data validity indicator 208 will be described later. No explanation will be necessary for the program identifier 202, input data number 203, output data number 205 and output data storage 210. In one embodiment, the input situation indicator 204 contains a group of flag bits each being alotted to each of the input data, and the level "1" indicating that the associated input data has not yet been formed, and the level "0" indicating that the associated input data has been formed already. As will be described later, however, any other form may be employed.

The input data class 206 consists of a 1-bit flag which assumes "0" when the associated input data is a fixed data (such as a constant) that has been given in advance, and which assumes "1" when the associated input data is an output data of another program. In the former case, the data itself has been written beforehand onto the input data indicator area 207. In the latter case, an address from which the data is to be read i.e. the address of output data storage 210 of I/O PTBL associated with the processing program module that produces the data) has been written thereon. In the output notice destination number area 209 has been stored the number of processing program modules that require the associated output data as input data, and on the output notice destination designator area 211 has been written the address of, the I/O PTBL (more specifically the position of the corresponding bit of the input situation indicator 204) associated with a processing program module which is an output notice destination. These information, except 201, 204, 208 and 210, are all fixed information that have been determined at the stage of programming. However, the initial value of the indicator 204 has been determined in advance.

Figure 5:
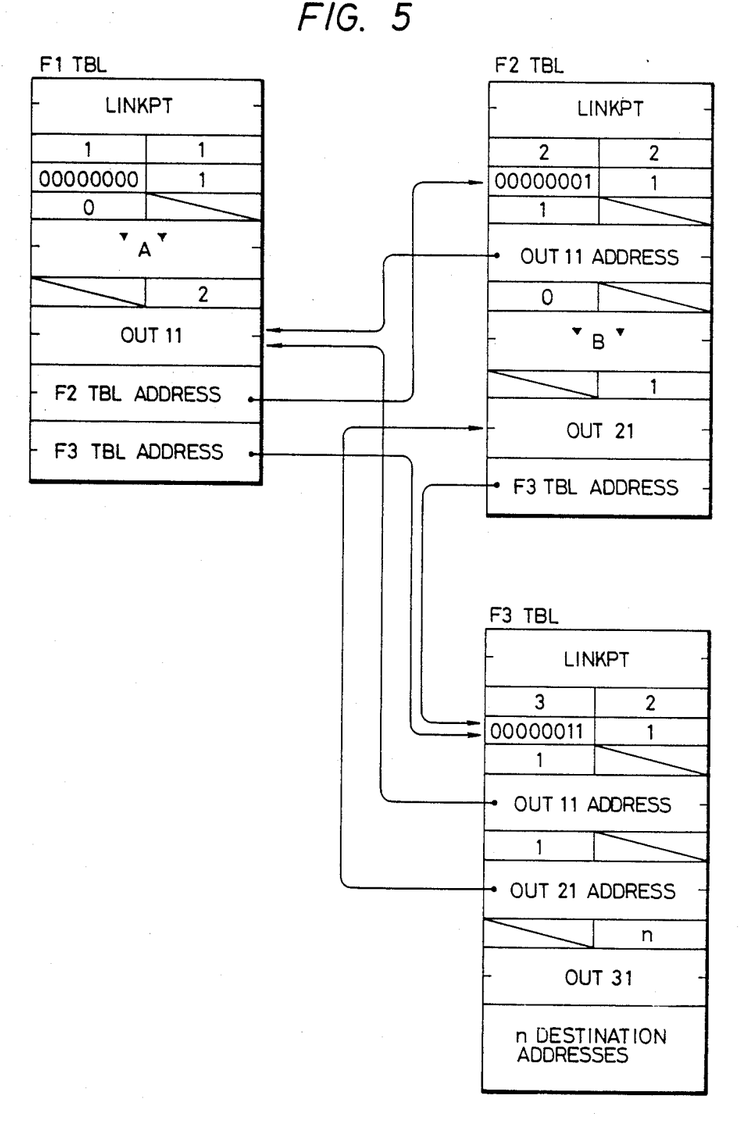
FIG. 5 shows input/output prescription tables for the program of FIG. 3.

FIG. 5 shows I/O PTBL's for the data driven type program of FIG. 3. The first processing program module (hereinafter simply referred to as program) F1 has only the input data A (literal) that is given in advance, and produces the output data D only, which is to be used as a first input data to the program F2 and a first input data to the program F3. In the I/O PTBL (F1TBL) for the program F1, therefore, the following relations hold true: program number (202)=1, input data number (203)=1, initial value of input situation indicator (204) ="00000000", output data number (205)=1, first input data class (206) ="0", first input data designator (207)='A' (literal), output notice destination number (209) of first output data=2, output notice destination (211) of first output data=F2TBL address and F3TBL address.

The second program F2 receives a first input data which is produced by the program F1, receives a second input data B (literal) that has been given in advance, and produces the data of which the number is 1 and which is used as a second input data for the program F3. In the I/O PTBL (F2TBL) for the program F2, therefore, the following relations hold: program number (202)=2, input data number (203)=2, initial value of input situation indicator (204)="00000001", output data number (205)=1, first input data class (206)="1", first input data designator (207)=OUT 11 address (address of first output data storage of F1TBL), second input data class (206)="0", second input data designator (207)='B' (literal), output notice destination number (209) of first output data=1, output notice destination designator (211) of first output data=F3TBL address.

The third program F3 receives a first input data produced by the program F1, receives a second input data produced by the program F2, and produces a single output data. Though not shown, there are n programs which use, as input data, the data produced by the program F3. In the I/O PTBL (F3TBL) for the program F3, therefore, the following relations hold: program number (202)=3, input data number (203)=2, initial value of input situation indicator (204)="00000011", output data number (205)=1, first input data class (206)="1", first input data designator (207)=OUT 11 address, second input data class (206)="1", second input data designator (207)=OUT 21 address (address of first output data storage of F2TBL), output notice destination number (209) of first output data=n, output notice destination designator (211) of first output data- =addresses of the n I/O prescription tables.

Figure 6:
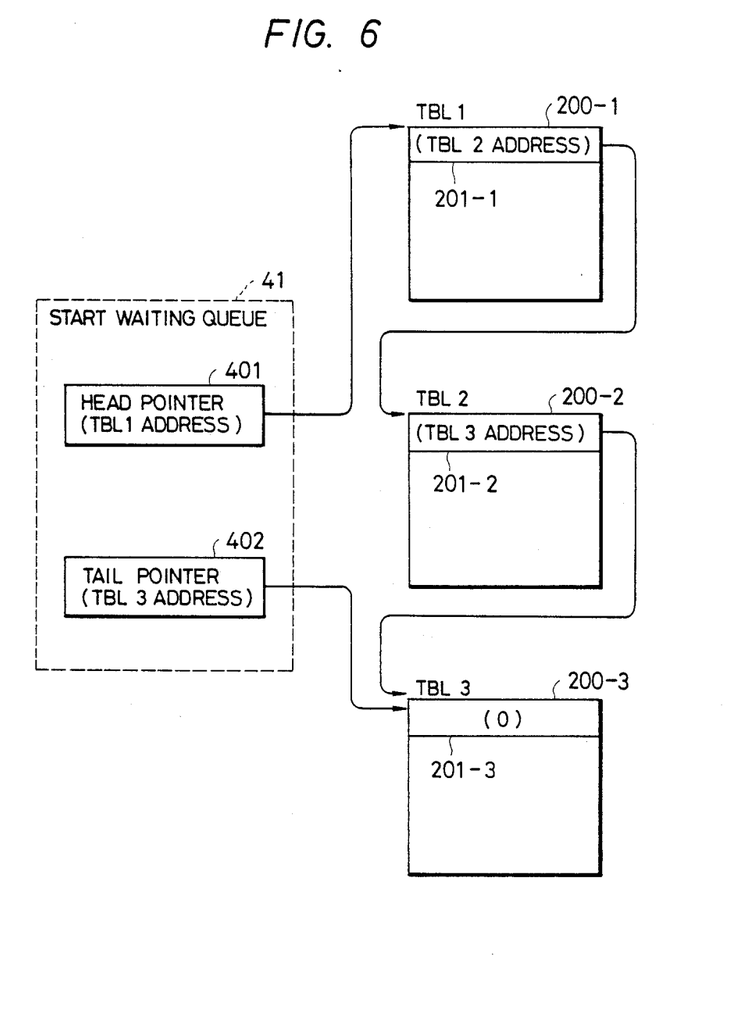
FIG. 6 shows a start waiting queue.

The start waiting queue (40-1, 41, hereinafter represented by 41) may be an ordinary FIFO memory. According to this embodiment, however, the queue is linked by a linkage pointer (201 of FIG. 4) of I/O PTBL in order to simplify the construction of the queue. In FIG. 6, the start waiting queue 41 is simply equipped with a head pointer 401 and a tail pointer 402. The head pointer 401 holds the address of I/O PTBL (TBL1) 200-1 at the beginning of the queue. The linkage pointer 201-1 of TBL 1 holds the address of I/O PTBL (TBL2) in the next place in the queue, and so on. The linkage pointer 201-3 of I/O PTBL (TBL3) at the end of the queue holds "0" to indicate that there exists no further link. The tail pointer 402 in the start waiting queue 41 holds the address of I/O PTBL (TBL3) at the end.

An I/O PTBL is fetched from the queue by reading the contents of the head pointer 401. Then, the contents of the head pointer 401 is replaced by the contents of the linkage pointer of I/O PTBL that has just been read out (adress of TBL2 held in TBL 1 in the diagrammed example). An I/O PTBL can be newly registered in the queue by writing its address onto both the tail pointer 402 and the linkage pointer 201-3 of I/O PTBL (TBL3) located at the tail. At the same time, the linkage pointer of I/O PTBL that is newly registered is set to "0".

Figure 7:
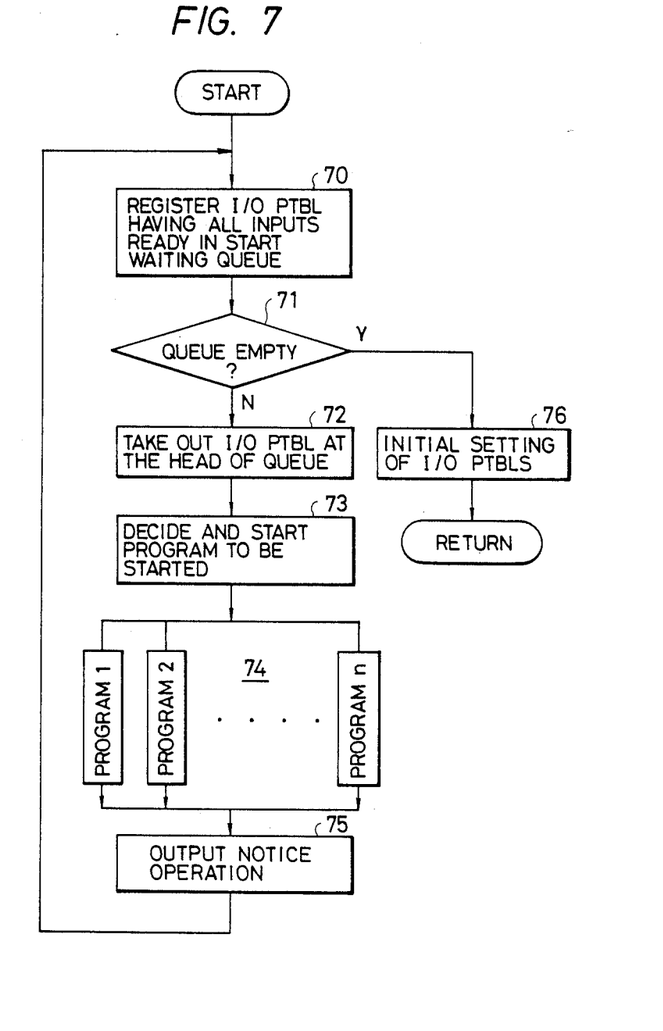
FIG. 7 is a flow chart showing an execution control sequence.

Next, operation of the system of FIG. 2 will be described below with reference to FIG. 7 when the program of FIG. 3 is to be executed in accordance with the I/O PTBL of FIG. 5. In the F1TBL which is the I/O PTBL associated with the program F1, the input situation indicator 204 is all "0", showing that the input data has already been prepared. Therefore, the execution control program 31 first registers the address of F1TBL in the start waiting queue 41 (step 70 in FIG. 7). Then, the execution control program 31 examines (step 71) the head pointer 401 of start waiting queue 41, reads the contents thereof (the address of F1TBL in this example)

(step 72), makes reference to the corresponding table based thereupon to determine from the program number 202 that the program to be started is the program F1, and hands the control over to the program F1 (step 73). When the input data from the outside is to be used as the operand, the program F1 makes reference to F1TBL, and detects that the number of input data is one, and that it is the one stored in the input data designator area 207, since the input data number 203 is "1" and he input data class 206 is "0". Therefore, the program F1 reads 'A' from the area 207 and performs a predetermined operation. The program F1 stores the result of operation, i.e. stores 'D', in the OUT 11 which is the first output data storage 210, and returns the control back to the execution control program 31 (step 74) when the program is finished.

The execution control program 31 then makes reference to the I/O PTBL associated with the program F1 that has just been executed, i.e. makes reference to the F1TBL. Then, in accordance with the output notice destination designator 211, the execution program 31 resets (step 75) the corresponding bits in the input situation indicator 204 in the F2TBL and F3TBL to "0". When there is an I/O PTBL in which the input situation indicator 204 is all "0", it (F2TBL in this example) is registered (step 70) in the start waiting queue 41.

When it is detected that no I/O PTBL remains in the start waiting queue 41, the execution control program 31 decides that the whole processing is finished, and sets the bits in the input situation indicator 204 corresponding to input data from other programs to "1" for all I/O PTBL's relying upon the input data number 203 and the input data class 206, and then resumes the initial condition.

According to a modified form, the input situation indicator 204 may be a counter. In this modification, the input data number 203 does not represent the number of all input data but represents the number of output data only of other programs, and this number is set as an initial value of the counter and is counted down in response to the output notice operation. When the counted value has reached a predetermined value, it is decided that the necessary input data are all furnished. An embodiment of this type will be mentioned later.

In general, the input data are furnished nearly in a predetermined order. Those which may be furnished last are, in many cases, limited to particular minority data. In such a case, the number of data that are likely to be furnished last is employed as the input data number 203, and the initial condition of input situation indicator 204 is set correspondingly. Furthermore, the output notice destination number 209 and the output notice destination designator 211 are set for those data that are likely to be furnished last. According to this method, the overhead can be reduced for the output notice operation.

Figure 8:
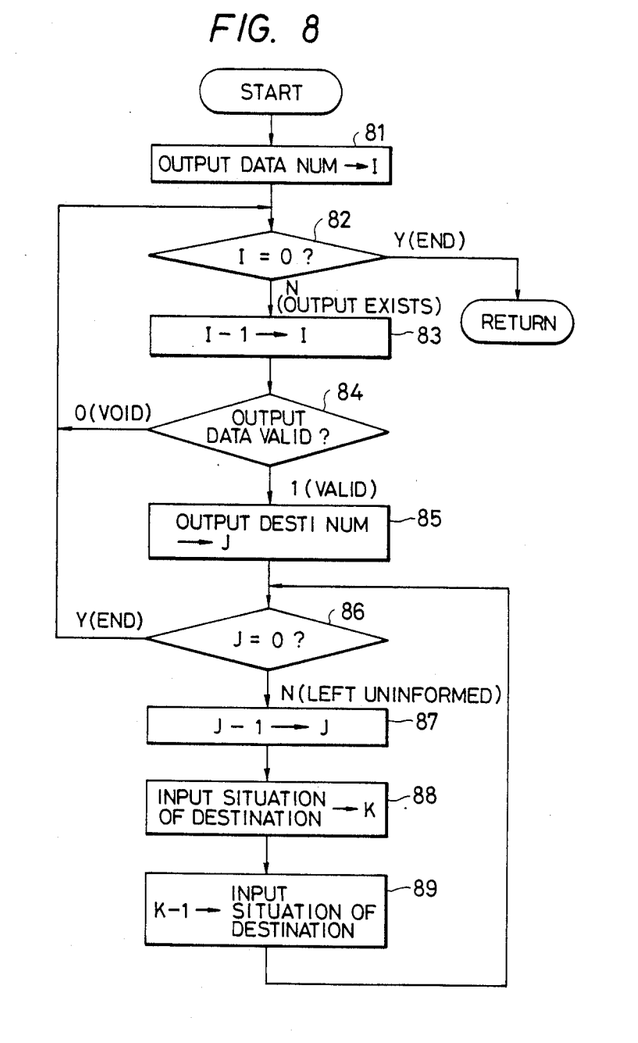
FIG. 8 is a flow chart showing an output notice sequence.

There are cases in which the flow of processing branches depending upon predetermined conditions. In such cases, the output notice destination differs depending upon the direction of branch, and the I/O PTBL requires the output data areas (208 to 211 in FIG. 4) of a number equal to the number of branches. In practice, however, the output notice operation is executed for only the output data area that corresponds to a selected branch. The output data validity indicator 208 is provided to deal with such a situation. According to the processing program, "1" is set in the output data validity indicator 208 in the output data area corresponding to the selected branch when the output data is stored in the output data storage 210, and the control is returned to the execution control program. As shown in FIG. 8, the execution control program examines as many output data areas as is indicated by the output data number 205, examines the output data validity indicator 208 (steps 81 to 84), and performs the output notice operation (steps 85 to 89) for only those outputs of which the output data validity indicator 208 is "1".

Where several processing programs are started many times repetitively (for example, in an electronic switching system), the system performance is greatly affected by the quantity of processing for initially setting the input situation indicator 204. The form of input situation indicator 204 and the handling thereof mentioned earlier with reference to FIG. 5 are not suitable for that, since the initial setting must be done every time for all the input situation indicators. The modification that will be mentioned below is preferable for the above-mentioned type of operation.

In this modification, the input situation indicator 204 functions as a counter, and holds only the number of necessary outputs of other processing programs as its initial value. As an exception, however, the initial value of the input situation indicator 204 for the program that does not need outputs of other programs, is forcibly set to "1". The initial setting of all input situation indicators that should have the initial value "1" can be effected at the time of setting up the system. In the initial setting operation, the execution control program 31 sets the disignated initial value for only the input situation indicators in which the designated initial value is "2" or greater. After the initial setting is completed, the execution control program 31 registers the I/O PTBL associated with a particular program which is predetermined to be started first at the head of the start waiting queue 41. In this modification, it is necessary to determine beforehand the program that is to be started first. The reason is that the input situation indicator 204 itself does not indicate that, the whole inputs are ready. Thereafter, the process similar to the one mentioned earlier proceeds.

Being informed of the completion of process of a processing program, the execution control program 31 examines the associated I/O PTBL 21, and checks the values of input situation indicators 204 of all output notice destinations that are indicated. If the value is greater than "1", it is decreased by "1". However, if the value is "1", the execution control program 31 decides that the required input data are all ready, and registers the associated I/O PTBL at the tail of the start waiting queue 41 without decreasing the value.

Figure 9:
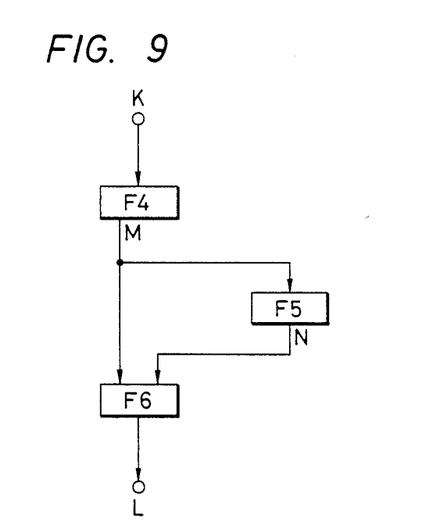
FIG. 9 is a program chart showing another data driven type program.
Figure 10:
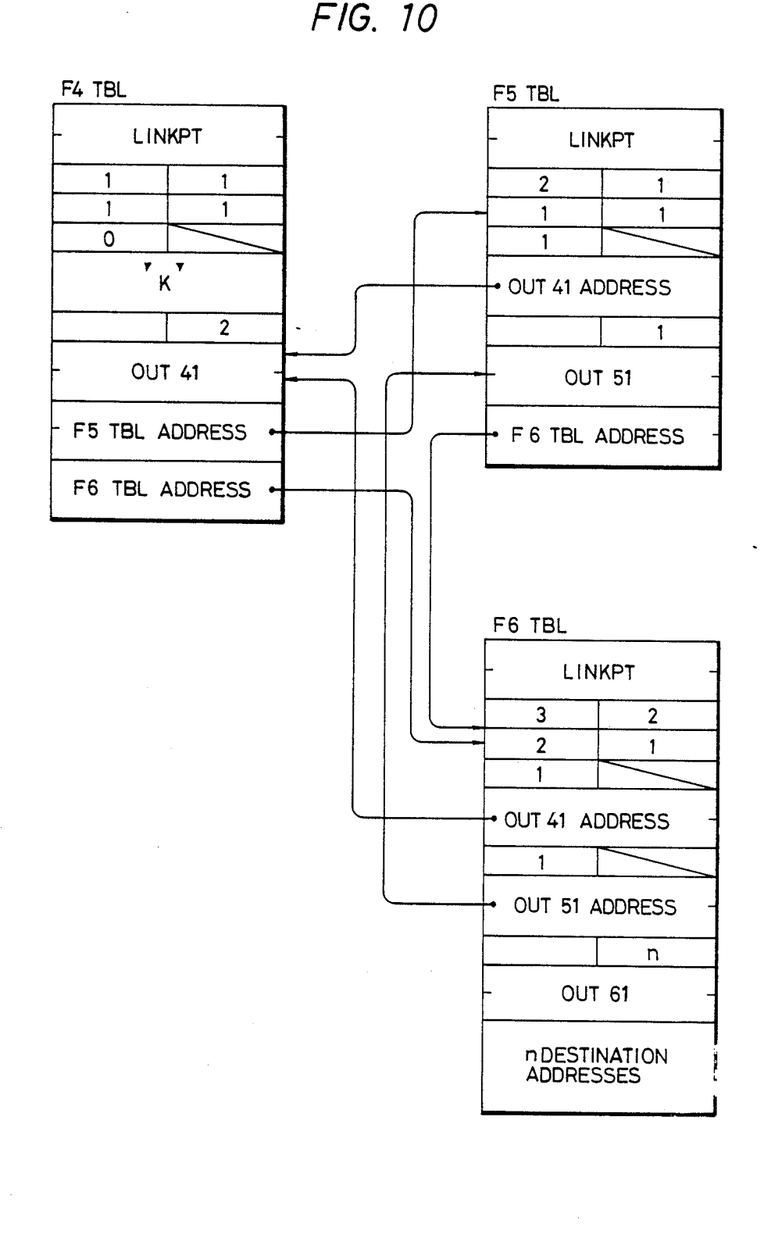
FIG. 10 shows input/output prescription tables for the program of FIG. 9.
Figure 11:
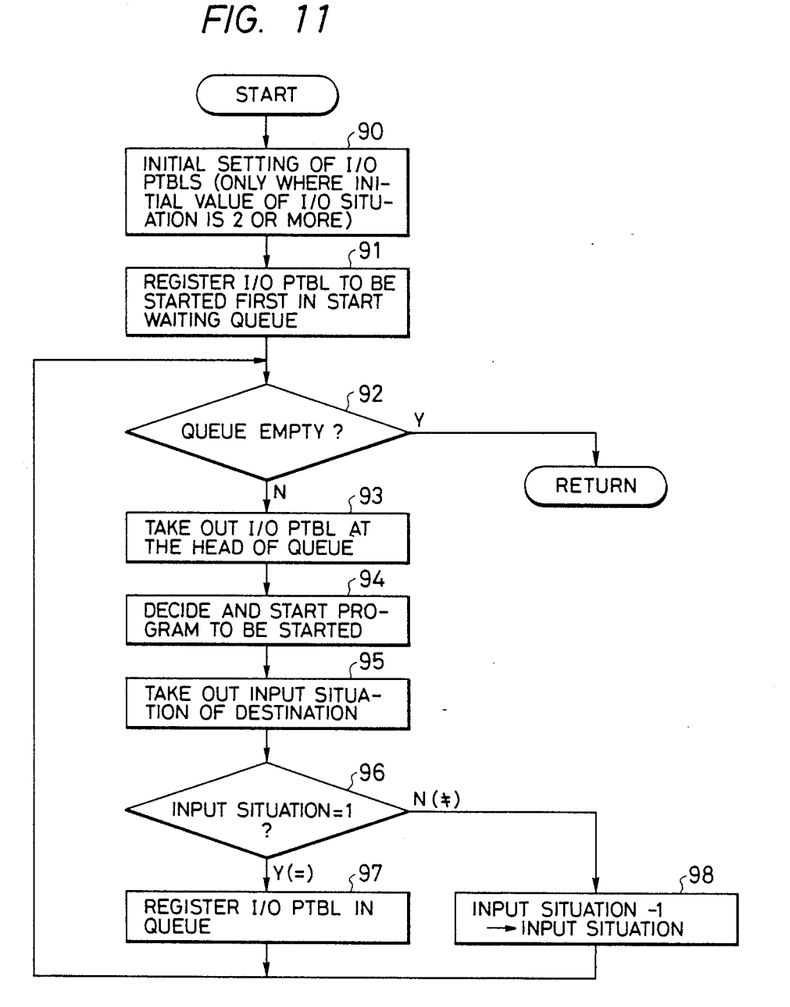
FIG. 11 is a flow chart showing another execution control sequence.

The modification will be explained below in further detail with reference to FIGS. 9 to 11. FIG. 9 shows another data driven type program which is fundamentally the same as the program shown in FIG. 3, except that the input data B is not included. FIG. 10 shows I/O PTBL's for the program of FIG. 9, which are also fundamentally the same as those of FIG. 5. However, the form of input situation indicator 204 is different from that of FIG. 5. Though the program F4 has only one fixed input data K, the input situation indicator (hereinafter called input situation counter as far as this modification is concerned) of its associated I/O PTBL (F4TBL) contains the initial value "1". The program F5 needs, as its sole input data, the output data M produced by the program F4. Therefore, the input situation counter of its associated I/O PTBL (F5TBL) contains the initial value "1". The program F6 needs, as its input data, the output data M of the program F4 and the output data N of the program F5. Therefore, "2" must be initially set in the input situation counter of its associated I/O PTBL (F6TBL). The input data number 203 contains the same value as the initial value of the input situation counter.

Operation of the control system of FIG. 2 will be described below with reference to FIG. 11, when the program of FIG. 9 is to be executed in accordance with the I/O PTBL of FIG. 10. First, the execution control program 31 sets predetermined initial values in those input situation counters 204 that have designated initial values of 2 or more among the I/O PTBL's 21 associated with the processing program modules 11 that are to be executed (step 90 in FIG. 11). At the time of system set up, "1" has been set as the initial value in the input situation counters of all I/O PTBL's. In this example, "2" is set as an initial value in the input situation counter of F6TBL. Next, the address of F4TBL that has been determined to be started first is registered in the start waiting queue 41 (step 91). Then, the execution control program 31 examines the head pointer 401 of the start waiting queue 41 (step 92), takes out the contents (address of F4TBL in this example) (step 93), makes reference to the corresponding table based thereupon to learn from the program number 202 that the program F4 is the one that is to be started, and hands the control over to the program F4 (step 94). When the input data from the outside is to be used as the operand, the program F4 makes reference to F4TBL to examine the input data areas (all sets of areas 206 and 206), detects that the number of input data is one which is the data stored in the input data designator area 207, and reads 'K' therefrom to perform the predetermined operation. The program F4 stores 'M' which is the result of operation in the first output data storage 210, i.e. in OUT 41, and sets "1" in the output data validity indicator 208. When the processing program is finished, the processing program F4 returns the control back to the execution control program 31.

Then, the execution control program 31 makes reference to F4TBL which is the I/O PTBL associated with the processing program F4 that has just been executed. The execution control program 31 then reads the input situation counters 204 of F5TBL and F6TBL according to the output notice destination designators 211 that accompany the output data whose output data validity indicators 208 have been set to "1" (step 95). The execution control program 31 decides whether the input situation indicators 204 are "1" or not (step 96). If there is any I/O PTBL that contains "1", it (F5TBL in this example) is registered in the start waiting queue 41 (step 97). If the value is not "1", the input situation counter 204 (input situation counter of F6TBL in this example) having such a value is decreased by "1", and is thus updated (step 98). Thereafter, the programs F5 and F6 are executed in like manner. When it is detected that there is no I/O PTBL that has been registered in the start waiting queue 41 (step 92), the execution control program 31 decides that the whole processing is completed.

According to this method, when an I/O PTBL furnished with all input data (input situation counter=1) is found, the execution control program need not decrease the input situation counter. Further, at the time of initial setting, it is necessary to operate only on those I/O PTBL's that require two or more outputs of other programs. Therefore, where most of the processing programs need only one output of other programs as an input, the processing time of the execution control program can be greatly reduced, making it possible to minimize the reduction of processing ability of the system caused by the intervention of execution control program.

Figure 12:
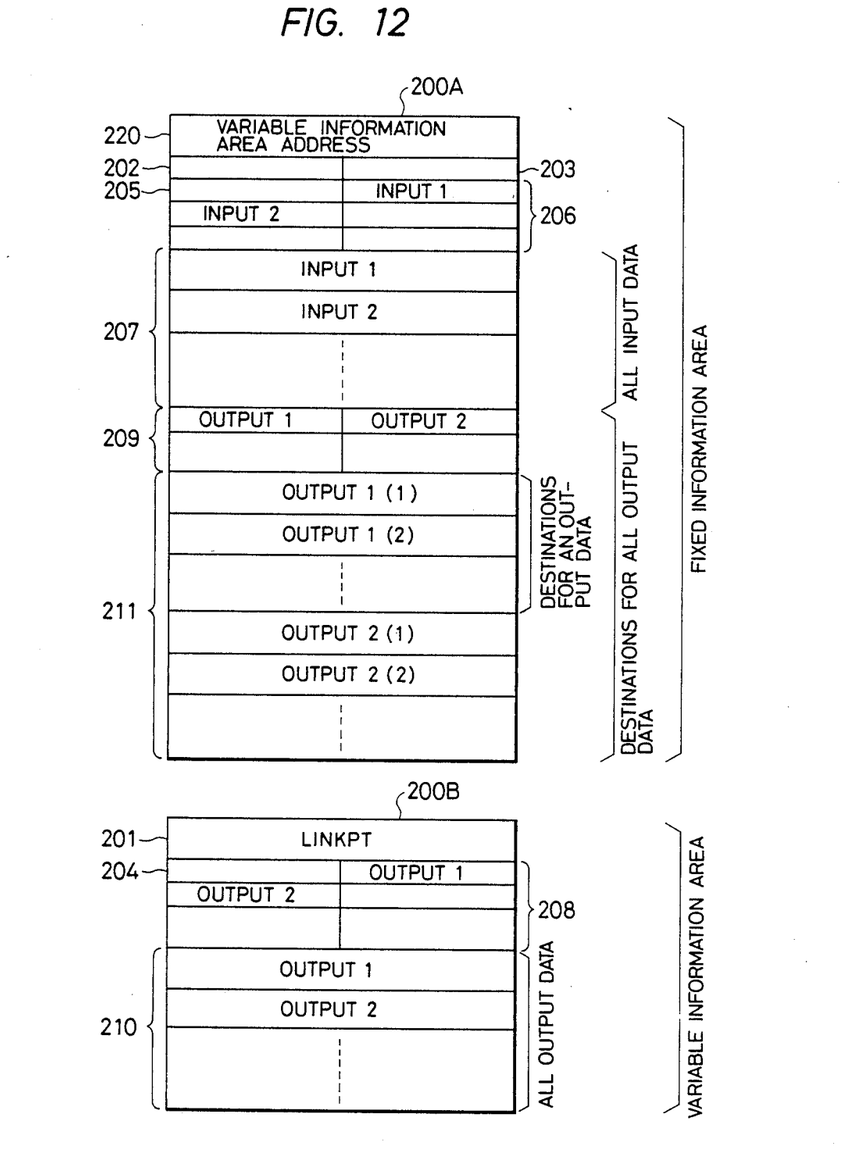
FIG. 12 shows another input/output prescription table.

The information contained in the I/O PTBL can be classified into fixed information and variable information as described earlier. Therefore, the information may be separated, and the fixed information may be stored in a read-only memory. FIG. 12 shows the construction of I/O PTBL in such a case. A fixed information area 200A is contained in a read-only memory, and a variable information area 200B is contained in an ordinary rewritable memory. To maintain linkage between these two areas, the fixed information area 200A is provided with a region 220 that holds the address of variable information area 200B. Other referencenumerals denote the same portions as those of FIG. 4. This arrangement is not suited for a general-purpose machine, but is suited for a special-purpose machine (such as electronic switching control machine). Use of the read-only memory helps increase the reliability and the operation speed.

Figure 13:
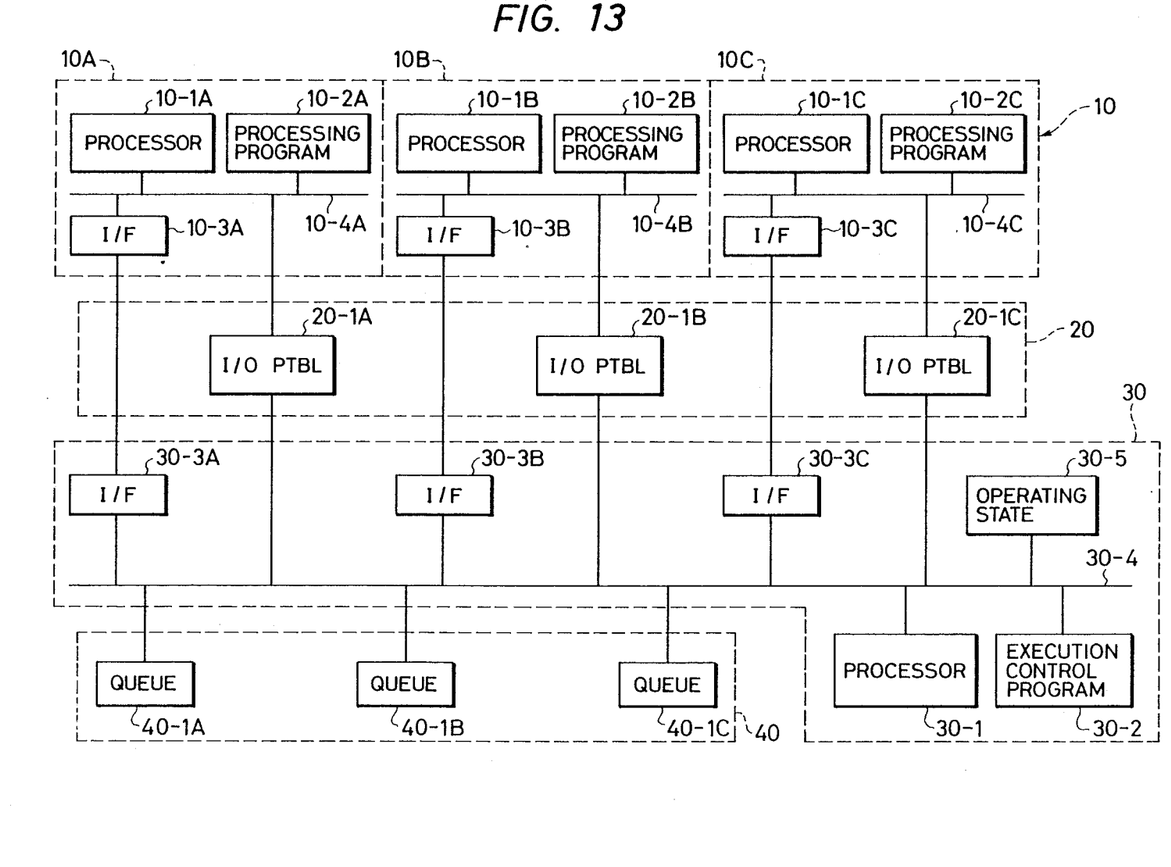
FIG. 13 shows a further data processing system according to the present invention.

FIG. 13 shows a developed form of the system of FIG. 1, wherein provision is made for three processing units for data processing 10A, 10B and 10C, and, in association therewith, input/output prescription tables (I/O PTBL's) 20-1A to 20-1C, start waiting queues 40-1A to 40-1C, and interface circuits 30-3A to 30-3C in the processing unit for execution control. The processing unit 30 for execution control successively examines the I/O PTBL's 20-1A, 20-1B and 20-1C. When a table furnished with all of the input data is found, the processing unit 30 registers it in one of the start waiting queues 40-1A, 40-1B, 40-1C associated therewith. An indicator 30-5 is provided to indicate the operating state of the data processing units 10-1A to 10-1C. When an output notice operation is finished for a given I/O PTBL, the processing unit 30 for execution control makes reference to the indicator 30-5, fetches an I/O PTBL from the start waiting queue associated with a data processing unit that is not in operation, causes this processing unit to operate, and sets the corresponding indication in the indicator 30-5. This indication is reset when the completion of processing is reported from the processing unit. It is pointed out that the data processing units of any number can be provided and are not necessarily limited to only three.

Figure 14:
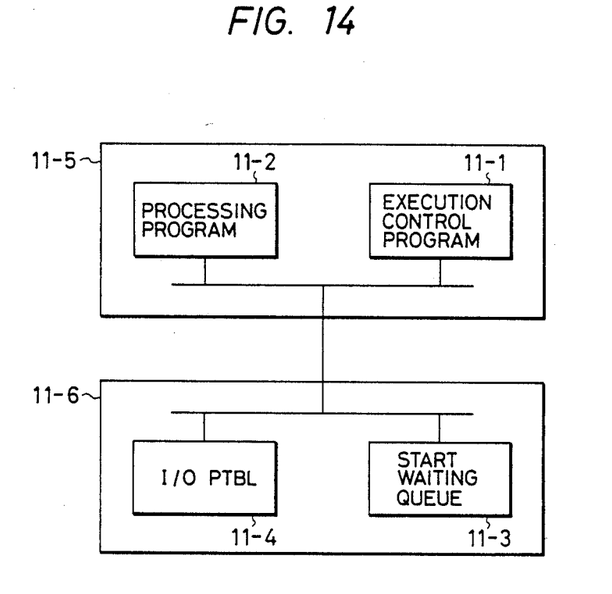
FIG. 14 shows a modified memory that is used in the present invention.

As another modification of the system, it is also effective to utilize the memories that operate at different speeds. FIG. 14 shows this modification, wherein the execution control program 11-1 and processing programs 11-2 are grouped into a block 11-5, and the start waiting queue 11-3 and I/O PTBL's 11-4 are grouped into another block 11-6. Referring, for instance, to the software for an electronic switching control machine, the total amount of memories for the two blocks will be about two megabytes, wherein the block 11-5 occupies about 40 kilobytes which is about 2% of the total amount. Concerning the number of dynamic steps required for the processing of one round, on the other hand, the block 11-5 occupies about 20 to 25 kilosteps among the total of about 40 kilosteps. This is a tendency found in general. Taking this fact into consideration, a memory which operates as fast as possible is employed for the block 11-5. This modification is advantageous in that the speedup of only 2% of the memories results in the speedup of 60% of the entire operations. Not all of the processing programs in the group 11-2, but only those that are used frequently may be contained in the high-speed block 11-5.

We claim:

1. A method for performing data driven processing in a data processing system which comprises sequential execution processing means for performing functions by executing program instructions in a predetermined sequence and memory means containing a plurality of processing program modules, comprising the steps of:

storing in said memory means a plurality of input/output prescription tables each corresponding to a respective one of said processing program modules and including input data source information, input data preparation situation indicating information, output notice destination information and an output data storage area;

executing with said data processing system a processing program corresponding to one of said processing program modules such that input data for said processing program is fetched according to said input data source information contained in said corresponding input/output prescription table and output data is stored in said output storage area of said corresponding input/output prescription table;

updating with said data processing system said input data preparation situation indicating information in a different input/output prescription table which is designated by said output notice destination information in said corresponding input/output prescription table of said one of said processing program modules so as to indicate that corresponding input data is prepared;

selecting with said data processing system a different one of said processing program modules having an input/output prescription table whose input data preparation situation indicating information indicates that all input data necessary to perform said processing program thereof is prepared; and executing with said data processing system said processing program corresponding to said different one of said processing program modules which is selected by said selecting step;

wherein said input data source information includes constant data and address information for data produced by other processing program modules than the processing program module corresponding to the input/output prescription table in which said input data source information is held, and said corresponding input/output prescription table further includes input data class information for indicating whether said input data is produced by any of said other processing program modules or is constant data, and said first executing step includes the steps of fetching required input data from a memory location specified by said address information when said input data class information indicates that the required input data is produced by another processing program module, and fetching said constant data directly from said input/output prescription table when said input data class information indicates that the required data is constant data.

2. A method according to claim 1, wherein:

said storing step includes the step of setting said input data preparation situation indicating information at a value equal to the number of other processing program modules outputting data which is used as said input data when two or more output data of other processing program modules are to be processed, and setting said input data preparation situation indicating information at a value of "1" when one or no output data of said other processing program modules is to be processed;

said updating step includes the step of decrementing the value of said input data preparation situation indicating information by "1" where said value count is "2" or more, and leaving said value unaltered where said value is "1"; and said selecting step selects one of said input/output prescription tables whose input data preparation situation indicating information value is "1" at the start of said updating step.

3. A data processing system having input/output prescription table group memory means containing a plurality of input/output prescription tables, queue memory means, processing program module group memory means containing a plurality of processing program modules, execution control program memory means containing an execution control program, and sequential execution processing means, wherein:

said input/output prescription tables each corresponding to a respective one of said processing program modules, and each input/output prescription table includes input data source information, input data preparation situation indicating information, output notice destination information, and ann output data storage area;

said queue memory means includes means for holding address information for accessing a queue of said input/output prescription tables in said input/output prescription table group memory means in a first-in-first-out fashion; and said processing means includes means for executing said processing program modules and said execution control program, alternatively;

each of said processing program modules controlling said processing means to process input data designated by the input data source information in the corresponding input/output prescription table and to store resultant output data into the output data area in said corresponding input/output prescription table; and said execution control program controlling said processing means to update said input data preparation situation indicating information in a different input/output prescription table designated by the output notice destination information in the input/output prescription table corresponding to an executed processing program module so as to indicate that the corresponding input data is prepared, to add to said queue an input/output prescription table whose input data preparation situation indicating information indicates that all input data necessary to perform the corresponding processing program module is prepared, to fetch said input/output prescription table from said queue, and to start the processing program module corresponding to the input/output prescription table that is fetched from said queue.

4. A data processing system according to claim 3, wherein at least a portion of said processing program module group memory means and a portion of said execution control program memory means operate faster than any of said prescription table group memory means, and said queue memory means.

5. A data processing system according to claim 3, wherein said input/output prescription table group memory means consists of read-only memory means for storing at least said input data source information and said output notice destination information, and rewritable memory means for storing at least said input data preparation situation indicating information and said output data.

6. A data processing system having at least one processing subsystem comprising an input/output prescription table group memory unit, a queue memory unit and a processing unit which are interconnected, an execution control unit, and interface means for transmitting and receiving control information between said processing unit and said execution control unit, wherein:

said input/output prescription table group memory unit including means for holding a plurality of input/output prescription tables, each of which corresponds to a respective one of a plurality of processing program modules that are to be executed, and includes input data source information, input data preparation situation indicating information, output notice destination information, and an output data storage area;

said queue memory unit including means for holding address information as a queue for accessing input-/output prescription tables in a first-in-first-out fashion;

said processing unit includes processing program module group memory means for holding said plurality of processing program modules, and a first sequential execution processor which executes said processing program modules and informs said execution control unit via said interface means for completion of the execution of each processing program module, each of said processing program modules controlling said first sequential execution processor to process input data designated by the input data source information in a corresponding input/output prescription table and to store resultant output data into the output data storage area in said corresponding input/output prescription table; and said execution control unit includes execution control program memory means and a second sequential execution processor which executes said execution control program, said execution control program controlling said second sequential execution processor to update the input data preparation situation indicating information in an input/output prescription table designated by the output notice destination information in an input/output prescription table corresponding to an executed processing program module so as to indicate that the corresponding input data is prepared, to add and fetch said input/output prescription tables to and from said queue, and to command via said interface means said processing unit to start executing the processing program module corresponding to the input/output prescription table that is fetched from said queue.

7. A data processing system according to claim 6, wherein at least a portion of said processing program module group memory means and a portion of said execution control program memory means operate faster than any of said prescription table group memory means and queue memory means.

8. A data processing system according to claim 6, wherein said input/output prescription table group memory unit consists of read-only memory means for storing at least said input data source information and said output notice destination information, and rewritable memory means for storing at least said input data preparation situation indication information and said output data.

* * * * *